(12) United States Patent
Oelcer (10) Patent No.: US 7,254,180 B1
(45) Date of Patent: Aug. 7, 2007

(54) DISCRETE MULTITONE TRANSMISSION SYSTEMS

(75) Inventor: Sedat Oelcer, Au (CH)

(73) Assignee: International Business Machines Corporation, Armonk, NY (US)

( * ) Notice: Subject to any disclaimer, the term of this patent is extended or adjusted under 35 U.S.C. 154(b) by 1528 days.

(21) Appl. No.: 09/585,027

(22) Filed: Jun. 1, 2000

(30) Foreign Application Priority Data

Jun. 1, 1999  (EP) .................................. 99110542

(51) Int. Cl.
*H04L 5/12* (2006.01)
(52) U.S. Cl. ..................................................... 375/261
(58) Field of Classification Search ................ 375/259, 375/265, 261, 298, 329; 455/102, 105, 115, 455/116, 126, 127; 370/205, 204, 206, 210, 370/302, 203
See application file for complete search history.

(56) References Cited

U.S. PATENT DOCUMENTS

| | | | | |
|---|---|---|---|---|
| 5,822,323 | A * | 10/1998 | Kaneko et al. | 370/480 |
| 6,459,678 | B1 * | 10/2002 | Herzberg | 370/203 |
| 6,483,869 | B1 * | 11/2002 | DesJardins | 375/222 |
| 6,512,797 | B1 * | 1/2003 | Tellado et al. | 375/261 |

2002/0150152 A1 * 10/2002 Greszczuk et al. ......... 375/219

* cited by examiner

*Primary Examiner*—Emmanuel Bayard
(74) *Attorney, Agent, or Firm*—Douglas W Cameron (57) ABSTRACT

Systems for generating a discrete multitone signal are provided in which N carriers, corresponding to respective subchannels, are modulated in each sample period (T) of the signal by performing an inverse discrete Fourier transform of N modulation symbols $(X_k, \tilde{X}_k)$, each of which symbols $(X_k, \tilde{X}_k)$ represents a signal point in a QAM constellation for a respective subchannel, the QAM constellation comprising a basic constellation of $M \geq 2^m$ signal points where m is the number of data bits to be communicated over the subchannel in a sample period. For each of $N_c \leq N$ of the subchannels, an expanded QAM constellation is defined which comprises pM signal points including said basic constellation of points, where p is an integer greater than 1. In each expanded constellation, p−1 equivalent signal points are defined for each signal point of the basic constellation, where each of the p−1 equivalent points is selected from redundant points in the opposite quadrant of the constellation to the corresponding point of the basic constellation. The discrete multitone signal is generated in a sample period (T) by selecting, for each of the $N_c$ subchannels, the modulation symbol $(X_k, \tilde{X}_k)$ representing either a basic constellation point or a corresponding equivalent point such that the peak value of the signal does not exceed a predetermined threshold.

18 Claims, 4 Drawing Sheets

Figure 2 expansion x2

Figure 5  clipping threshold to average power ratio $PAR_0$ (dB)

Figure 6  clipping threshold to average power ratio $PAR_0$ (dB)

DISCRETE MULTITONE TRANSMISSION SYSTEMS

CROSS REFERENCE TO RELATED APPLICATIONS

This application claims priority to European Patent Application 99110542.0, filed on Jun. 1, 1999 and now abandoned.

BACKGROUND OF THE INVENTION

1. Field of Invention

This invention relates generally to discrete multitone transmission systems, and more particularly to peak-to-average power ratio (PAR) control in such systems. Embodiments of the invention provide methods and apparatus for generating discrete multitone signals with reduced PAR.

2. Description of the Related Art

Figure 1A:
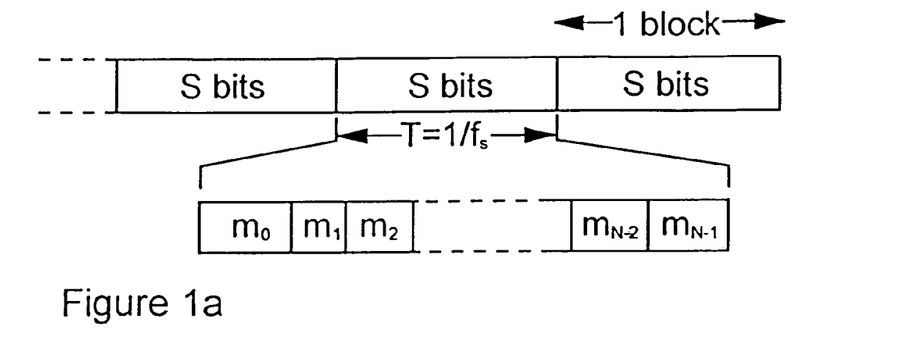
FIGS. 1a, 1b and 1c are diagrams illustrating the basic principles of multicarrier modulation.

In transmission systems employing multicarrier modulation, the transmission channel is generally divided into N narrowband subchannels with centre frequencies equally spaced across the usable frequency band, and the input data to be communicated over the transmission channel is used to modulate the N carriers. The basic principles of such systems will be described with reference to FIGS. 1a to 1c of the accompanying drawings. Referring to FIG. 1a, the input data is grouped into blocks of S bits at a block, or "symbol", rate of $f_s$. In each sample period, or "symbol period", $T=1/f_s$, the block of S bits is partitioned into groups of $m_k$ bits, where k=0 to N−1, and each $m_k$ is typically 2 to 8 bits. The groups of $m_k$ bits are then used to modulate N carriers $f_k$ spaced $\Delta f$ apart across the usable frequency band. Specifically, as illustrated schematically in FIG. 1b, each group of $m_k$ bits is used to index a frequency domain modulation symbol $X_k$ which is taken in general from a QAM (Quadrature Amplitude Modulation) constellation with $M_k=2^{m_k}$ complex points. FIG. 1c illustrates such a constellation for $m_k=4$, so that 16 complex points are provided for the 16 possible values of the 4-bit sequence $m_k$. Discrete multitone (DMT) modulation is a particular form of multicarrier modulation in which an inverse discrete Fourier transform (IDFT) is employed for signal modulation:

$$x_n = \sum_{k=0}^{N-1} X_k e^{j2\pi nk/N} \quad n = 0, 1, \ldots, N-1 \quad (1)$$

Figure 1B:
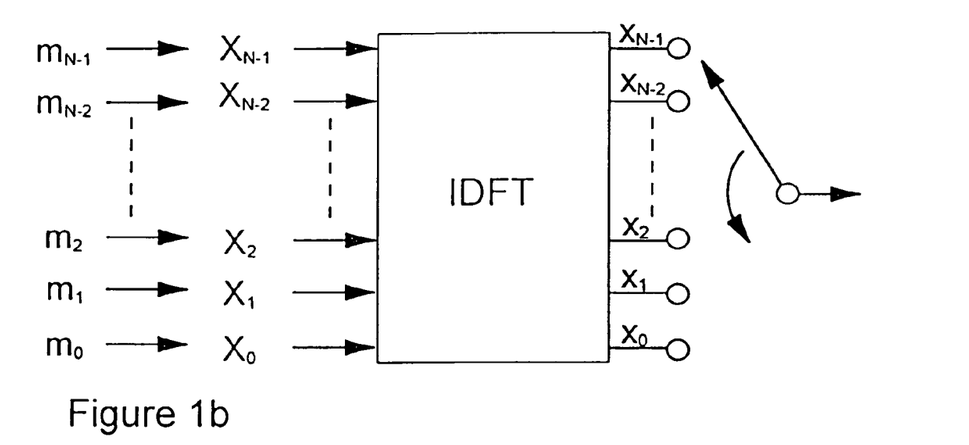
Figure 1C:
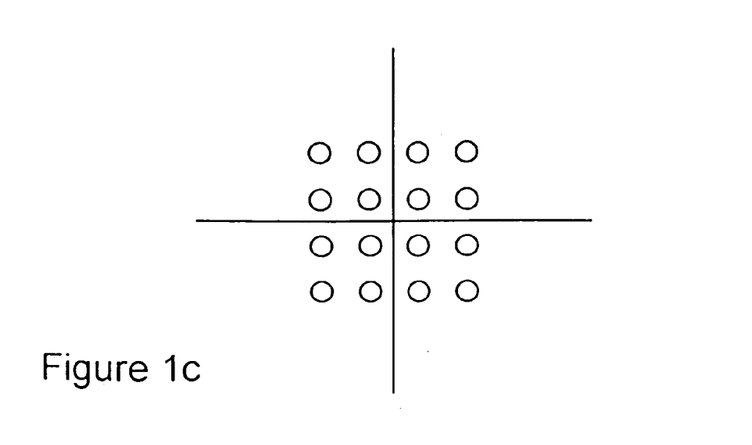

Thus, in each symbol period T, the N carriers are modulated as indicated in FIG. 1b by performing an IDFT of the N modulation symbols $X_k$ to generate a DMT symbol ($x_0$, $x_1$, ... $x_{N-1}$). Since the phases of the addends in equation (1) can build up constructively, the peak value of the signal $x_n$, relative to its average energy becomes an issue of concern for the realization of DMT-based transmission systems. The peak-to-average power ratio of such a system is defined by:

$$PAR=10 \log_{10}(P^2/\sigma_x^2)(dB) \quad (2)$$

In equation (2), P denotes the peak value of the signal sequence at the output of the IDFT, and $\sigma_x^2=E\{x_n^2\}$ with E denoting statistical expectation. For a well designed system, the probability of the PAR exceeding a threshold value defined by implementation constraints should be low. DMT systems with low PAR values allow efficient design of the signal converters, amplifiers, and the line driving and receiving circuits. By way of example, DMT is currently used in Digital Audio Broadcast and ADSL (Asymmetric Digital Subscriber Line), and is also proposed for VDSL (Very High Data Rate Digital Subscriber Line).

Schemes for providing PAR control in DMT systems are known in the art. Most of the known schemes involve transmitting side information, defining a transformation of the signal performed for PAR control, along with the data signal itself to enable the receiver to correctly demodulate the signal. With these schemes there is inherently a data rate loss due to the need to transmit the side information. ITU-T, Study Group 15, Temporary Document NF-83, Nice, France 11-14 May 1998 (A New Approach to PAR Control in DMT Systems) discloses a system which avoids data rate loss through use of expanded (redundant) QAM constellations. In this system, the QAM constellations are expanded beyond the minimum size necessary to support the required data rate on each subchannel. Specifically, for each point in the original minimum energy constellation, a number of equivalent points are defined by a modulo operation, the original and modulo-equivalent points constituting an "equivalence class" of points which represent the same input data. The input data is mapped to a particular equivalence class, and a PAR reduction algorithm then selects a particular signal point in that class, choosing the point which reduces the time domain peak amplitude. ANSI T1E1.4, Contribution 98-173, 4 Jun. 1998 (PAR Reduction with Minimal or Zero Bandwidth Loss and Low Complexity) also discloses a system which employs expanded constellations for PAR control. The particular technique discussed in detail in this document again involves defining equivalents to the standard minimum energy constellation points by a modulo operation. The peak value of the DMT symbol obtained using the minimum energy constellation points is first determined, and then an alternative, equivalent point is selected according to certain criteria and the DMT symbol is updated. This process is repeated until the desired PAR is achieved or certain performance limits are reached.

While the systems disclosed in the two documents referenced above can avoid data rate loss through use of expanded constellations, the penalty is an increase in the average transmit power and the additional complexity introduced by the modulo operations and PAR reduction algorithms.

BRIEF SUMMARY OF THE INVENTION

According to one aspect of the present invention there is provided a method for generating a discrete multitone signal comprising:

modulating N carriers, corresponding to respective subchannels, in each sample period of the signal by performing an inverse discrete Fourier transform of N modulation symbols, each of which symbols represents a signal point in a QAM constellation for a respective subchannel, the QAM constellation comprising a basic constellation of $M \geq 2^m$ signal points where m is the number of data bits to be communicated over the subchannel in a sample period;

defining, for each of $N_c \leq N$ of the subchannels, an expanded QAM constellation comprising pM signal points including said basic constellation of points, where p is an integer greater than 1;

defining, in each expanded constellation, p−1 equivalent signal points for each signal point of the basic constellation, where each of the p−1 equivalent points is selected from redundant points in the opposite quadrant of the constellation to the corresponding point of the basic constellation; and generating the discrete multitone signal in a sample period by selecting, for each of the $N_c$ subchannels, the modulation symbol representing either a basic constellation point or a corresponding equivalent point such that the peak value of the signal does not exceed a predetermined threshold.

In embodiments of the present invention, therefore, expanded constellations are defined in which a point in the original, basic constellation has p−1 equivalent points in the expanded constellation, and the p−1 equivalent points are selected from the redundant (ie. the additional or "non-basic") points in the opposite quadrant of the constellation to the corresponding basic constellation point. A DMT signal can then be generated by selecting modulation symbols representing the basic or equivalent signal points such that the peak value of the DMT symbol in a given symbol period is less than a desired threshold value. Use of this technique provides highly efficient DMT systems in which the PAR can be reduced to required levels without unacceptable power penalties or undue system complexity. The mapping of basic constellation points to equivalent points in the opposite quadrant is a particularly simple technique which can provide a large variation in the peak value of the DMT symbol, avoiding the need for the modulo operations used in the systems described above while allowing highly effective PAR reduction. Moreover, methods embodying the invention can be applied for any original symbol constellation, whereas not all original constellations are allowed with the modulo-extension methods. It will be appreciated that methods embodying the invention can be combined efficiently with other coding or PAR reduction techniques. In particular, for example, methods embodying the invention can be readily combined with trellis coding techniques without requiring the rather large constellations that can be generated if trellis coding is combined with the modulo-extension methods described above.

In general, expansion of the basic constellation by an integer factor can be performed, but in preferred embodiments p=2, so that an expanded constellation has twice the number of points as the basic constellation. This provides for exceptionally efficient systems, allowing ample PAR reduction for most applications without significant power penalties. For example, for ADSL, PAR reduction of about 4 dB is required and this is easily achieved by embodiments of the invention as will be illustrated below.

In some embodiments of the invention, the expanded QAM constellations and the equivalent points are defined explicitly in the system. For example, the expanded constellations may be defined in known manner in a QAM encoder which maps input bits to modulation symbols and in which the mapping between equivalent and basic points is defined. In such embodiments, the modulation symbols representing basic or equivalent signal points can be selected directly, and the IDFT can be performed using either the basic or equivalent modulation symbols. In other embodiments, the expanded constellations and equivalent signal points may be defined implicitly via other parameters. In particular, the expanded constellations and equivalent signal points can be defined implicitly by a prestored set of correction values, where each correction value represents the perturbation to be applied to a DMT symbol generated by performing the IDFT using a modulation symbol representing a basic constellation point to obtain the DMT symbol generated by performing the IDFT using the modulation symbol representing a corresponding equivalent point. In this case, when the modulation symbol representing a said equivalent point is selected for a subchannel, the method may include performing the IDFT using the modulation symbol representing the corresponding basic constellation point, and then applying to the resulting signal the correction value corresponding to said equivalent point to generate the DMT symbol. Here, therefore, a modulation symbol representing an equivalent signal point is selected indirectly through selection of the appropriate correction value to be applied to the original DMT symbol obtained by performing the IDFT using the basic modulation symbols. Thus, where an iterative process is performed to reduce the DMT peak below the threshold, it is not necessary to re-perform the IDFT each time a new symbol combination is selected, since the appropriate correction value or values can simply be added to the original DMT symbol. This process can reduce computation speed at the expense of the extra memory required for the correction values, and either method, or a combination of the two methods, can be employed as deemed most efficient for a particular application.

Various algorithms, iterative or otherwise, may be used for selecting the combinations of basic and equivalent modulation symbols used to produce a DMT symbol, but in a preferred embodiment the output DMT symbol is generated by:

(a) performing the IDFT using modulation symbols representing basic constellation points for the N subchannels;

(b) determining whether the peak value of the resulting signal exceeds the predetermined threshold, and if so selecting, for at least one of the $N_c$ subchannels, the modulation symbol representing a corresponding equivalent point; and (c) repeating step (b) until the peak value of the signal does not exceed said threshold. A particularly simple technique involves selecting, in successive iterations of step (b), different permutations of q modulation symbols representing equivalent signal points, where q=1 in a first pass and q=q+1 in each subsequent pass. This technique will be described in more detail below.

The basic constellation for a subchannel may have the minimum number of points necessary to support the required data rate, ie. $M=2^m$ points. However, where coding or other techniques are used in conjunction with the PAR reduction system for example, the basic constellation may have more than $2^m$ points.

It will be appreciated that DMT signals produced by embodiments of the invention may comprise subchannels additional to the N modulated subchannels. For example, there may be subchannels at de and the Nyquist frequency which are not modulated.

In accordance with a further aspect of the invention there is provided apparatus for generating a discrete multitone signal, the apparatus comprising:

a modulator for modulating N carriers, corresponding to respective subchannels, in each sample period of the signal by performing an inverse discrete Fourier transform of N modulation symbols, each of which symbols represents a signal point in a QAM constellation for a respective subchannel, the QAM constellation comprising a basic constellation of $M \geq 2^m$ signal points where m is the number of data bits to be communicated over the subchannel in a sample period;

means defining, for each of $N_c \leq N$ of the subchannels, an expanded QAM constellation comprising pM signal points including said basic constellation of points, where p is an integer greater than 1, and further defining, in each expanded constellation, p−1 equivalent signal points for each signal point of the basic constellation, where each of the p−1 equivalent points is selected from redundant points in the opposite quadrant of the constellation to the corresponding point of the basic constellation; and control logic for selecting, for each of the $N_c$ subchannels, the modulation symbol representing either a basic constellation point or a corresponding equivalent point for generation of the discrete multitone signal in a sample period such that the peak value of the signal does not exceed a predetermined threshold value.

The invention also provides a communication system comprising a transmitter incorporating DMT signal generating apparatus as described above for transmitting a DMT signal, and a receiver for receiving and demodulating such a DMT signal to generate the data represented thereby.

In general, it is to be understood that, where features are described herein with reference to a method embodying the invention, corresponding features may be provided in accordance with apparatus embodying the invention, and vice versa.

BRIEF DESCRIPTION OF THE DRAWINGS

Preferred embodiments of the invention will now be described, by way of example, with reference to the accompanying drawings in which.

DETAILED DESCRIPTION OF THE INVENTION

Figure 2:
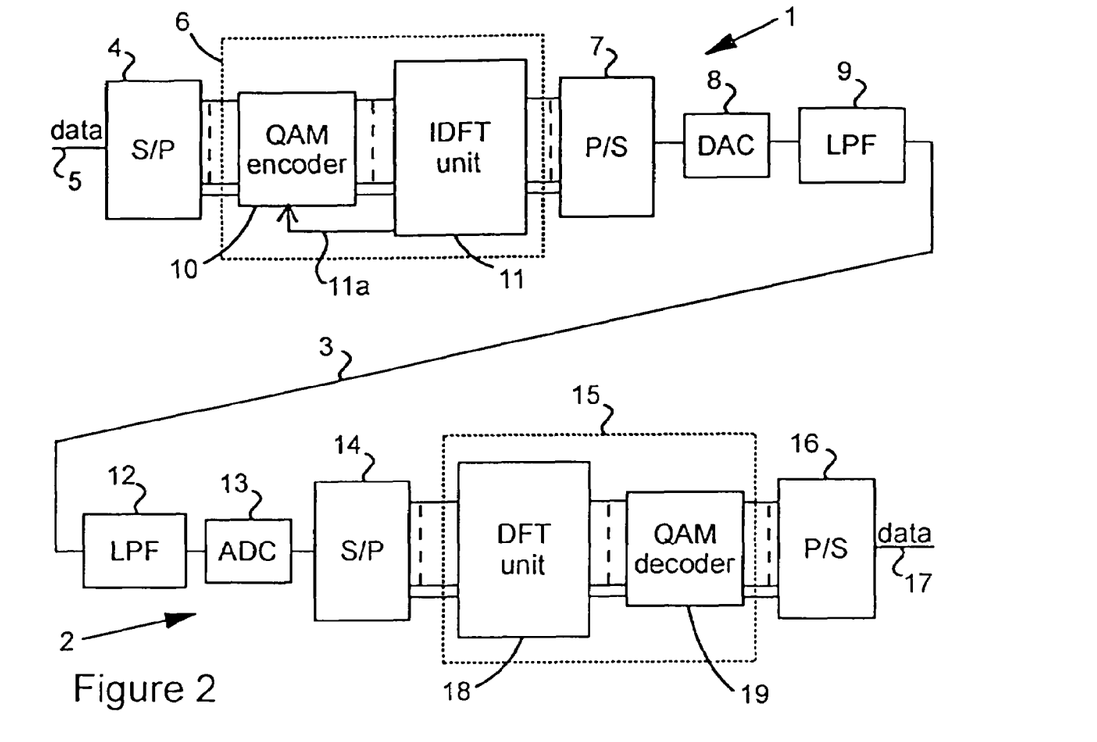
FIG. 2 is a schematic illustration of a simple communication system embodying the invention.

FIG. 2 illustrates a basic communication system embodying the invention comprising a transmitter 1 and a receiver 2 linked by a communication channel 3. The transmitter 1 in this example comprises a serial to parallel converter (S/P) 4 having a data input 5, a modulation unit 6 indicated by the dotted lines in the figure, a parallel to serial converter (P/S) 7, a digital-to-analogue converter (DAC) 8, and a low pass filter (LPF) 9, all connected as shown. The modulation unit 6 comprises a QAM encoder 10 and a modulator in the form of an IDFT unit 11 as illustrated. Control logic (not shown separately) is provided in the IDFT unit 11 for controlling operation of this unit and implementation of the PAR reduction process to be performed by the modulation unit 6. It will be appreciated that the control logic may be implemented in hardware or software, or a combination thereof, and suitable implementations will be apparent to those skilled in the art from the following description. A control input from the IDFT unit 11 to the QAM encoder 10 is indicated at 11a in the figure. This control connection is required for only one of the two modulation methods to be described below with reference to this figure. The receiver 2 comprises a low pass filter 12, an analogue-to-digital converter (ADC) 13, a serial-to-parallel converter 14, a demodulation unit 15 indicated by the dotted lines in the figure, and a parallel-to-serial converter 16, having a data output 17, all connected as shown. The demodulation unit 15 comprises a discrete Fourier transform (DFT) unit 18 and a QAM decoder 19 as illustrated. For the sake of simplicity, FIG. 2 does not show the functional elements relating to signal equalization that would be provided in practice to combat signal distortion introduced by the channel as will be apparent to those skilled in the art.

Briefly, in operation of the system, the input data signal is supplied as a serial bit-stream to the data input 5 of the S/P converter 4. The parallel outputs of the S/P converter 4 are supplied to the modulation unit 6 which operates as will be described in more detail below to generate a DMT signal which is then converted to serial form by the P/S converter 7. The output of the P/S converter 7 is converted to analogue form by the DAC 8 and then filtered by the LPF 9 for transmission over the channel 3. In the receiver 2, the received signal is filtered by the LPF 12, digitized by the ADC 13 and converted to parallel form by the S/P converter 14. The data is then demodulated by the demodulation unit 15 and converted to serial form by the P/S converter 16 to provide the original data on the output 17.

Figure 3:
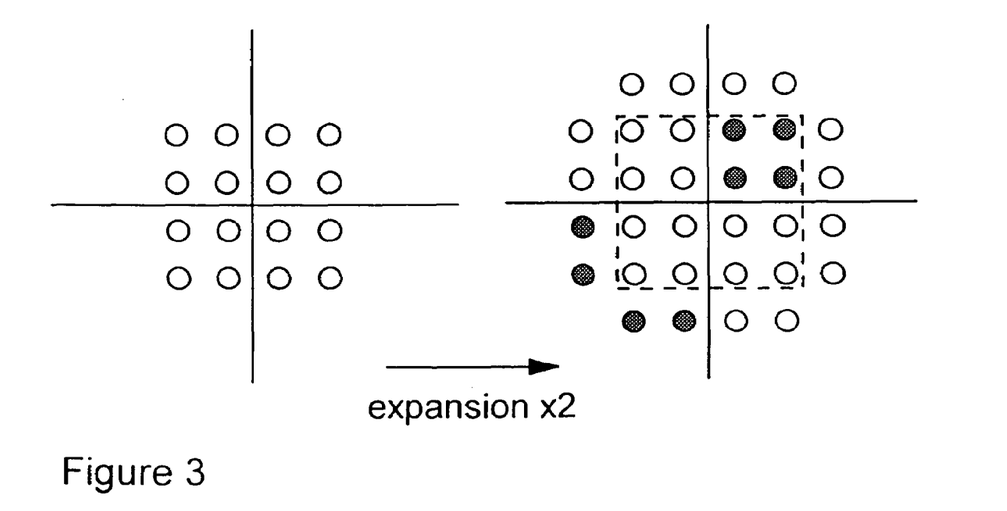
FIG. 3 illustrates expansion of a basic constellation for PAR control in embodiments of the invention.

The operation of the modulation unit 6, which in its own right constitutes DMT signal generating apparatus embodying the invention, will now be described in more detail. As explained earlier, the input data stream to be modulated is divided into blocks at the DMT symbol rate $f_s$, and each block is converted into N parallel groups of $m_k$ bits where k=0 to N−1. This is done by the S/P converter 4 so that, in each DMT symbol period T, the N groups of $m_k$ bits are supplied to respective parallel outputs of the S/P converter and received by the QAM encoder 10. The QAM encoder 10 maps the input $m_k$ bits on a given subchannel to a modulation symbol representing a signal point in a QAM constellation for the subchannel. The particular QAM constellation utilized by the encoder 10 generally depends on the number of bits in the group $m_k$, so that the same constellation may be utilized for more than one subchannel. In the first implementation method to be described, expanded QAM constellations are defined in the encoder 10 for a number $N_c$ of the subchannels, where $N_c<N$. Where $N_c<N$, the basic QAM constellations are defined for the remaining $N-N_c$ subchannels. Each expanded constellation has $2^{m_k+1}$ points. FIG. 3 shows an example of such an expanded constellation for $m_k=4$. The left-hand side of FIG. 3 shows the basic constellation which is made up in this case of the 16 lowest energy points needed to represent the 4-bit input data $m_k$. The expanded "cross" constellation shown on the right-hand side has 32 signal points including the 16 points of the basic constellation as indicated by the broken lines in the figure. The QAM encoder in this embodiment further defines, for each basic constellation point, an equivalent signal point from among the redundant (additional) signal points of the expanded constellation. Specifically, the equivalent signal point for each basic constellation point is selected from the redundant points in the opposite quadrant of the constellation to the corresponding basic constellation point. Thus, as indicated for example by the shaded dots in the figure, each of the basic points in the upper right quadrant of the constellation has an equivalent point ii the lower left quadrant. (Which of the four redundant points is mapped to a particular basic point is usually immaterial for system performance, and this provides a degree of freedom in system design). Thus, the input $m_k$ bits for the $N_c$ subchannels can be mapped to one of two possible modulation symbols, namely the symbol $X_k$ representing the basic constellation point or the symbol $\tilde{X}_k$ representing the equivalent constellation point. In the present embodiment, on first receiving the inputs $m_k$, the QAM encoder maps each input to the basic modulation symbol $X_k$ and outputs the N symbols $X_k$ to the IDFT unit 11.

Figure 4:
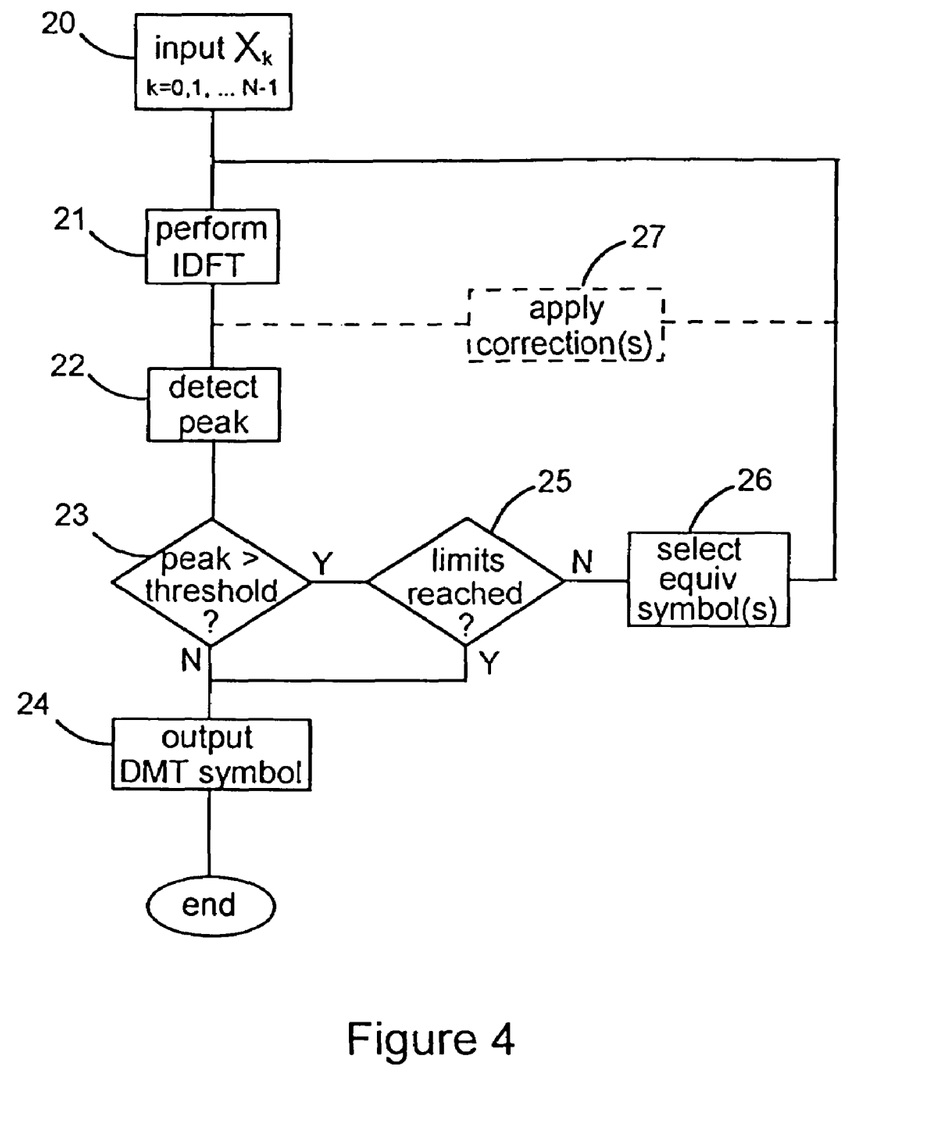
FIG. 4 is a flow chart illustrating operation of the IDFT unit of the system of FIG. 2.

The subsequent operation of the IDFT unit 11 will be described with reference to FIG. 4. (In this flow chart, the step indicated by the broken lines is an alternative step which relates to a second implementation method to be described below and may be ignored in the following description of the first implementation method). The process starts at step 20 when the IDFT unit 11 receives the modulation symbols $X_k$ from the QAM encoder 10. In the first method to be described, the received symbols are temporarily stored in a memory (not shown separately) of the control logic for later use as described below. In step 21, the IDFT unit 11 modulates the N carriers as previously described by performing an IDFT of the N modulation symbols $X_k$ according to:

$$x_n = \sum_{k=0}^{N-1} X_k e^{j2\pi nk/N} \quad n = 0, 1, \ldots, N-1 \quad (1)$$

Here, in order for the time-domain signals $x_n$ to be real, the set of symbols $X_k$ should satisfy a conjugate symmetry condition: $X_k = X^*_{N-k}$, where k=1 to N-1 and * denotes complex conjugation. Also, the symbol $X_0$ should be real, and if N is even $X_{N/2}$ should also be real. The IDFT is preferably implemented here as an inverse fast Fourier transform (IDFT) as will be apparent to those skilled in the art.

The result of step 21 here is therefore a DMT symbol ($x_0$, $X_1$, ... $X_{N-1}$) produced using the modulation symbols $X_k$ representing the basic constellation points for the input data. In step 22, the control logic in the IDFT unit 11 detects the peak value of the DMT symbol, and in step 23 the control logic determines whether this peak exceeds a prestored threshold. The appropriate threshold here is determined by implementation constraints as will be apparent to those skilled in the art. If the peak does not exceed the threshold, the DMT symbol is acceptable and the process proceeds to step 24 where the DMT symbol is output by the IDFT unit for transmission.

Returning to step 23, if the control logic determines here that the peak value of the DMT symbol exceeds the threshold, operation proceeds to step 25 where the control logic checks whether certain processing limits have been reached. For example, the DMT symbol generation process may be limited to a particular maximum number of iterations or a maximum transmit power increase depending on system constraints. Assuming the specified limits have not been reached, the control logic then selects, for one or more of the $N_c$ subchannels with expanded constellations, the equivalent modulation symbol $\tilde{X}_k$. In this first embodiment, the control means selects the appropriate symbol(s) $\tilde{X}_k$ by instructing the QAM encoder 10, via control input 11a, to output the equivalent symbol(s) for the appropriate subchannel(s). The process then reverts to step 21 where, on receipt of the new symbols, the IDFT unit 11 reperforms the IDFT using the originally received basic modulation symbols $X_k$ stored in the memory but substituting the newly supplied equivalent symbol(s) $\tilde{X}_k$ for the appropriate subchannel(s). The IDFT unit thus generates a new DMT symbol:

$$y_n = \sum_{k=0}^{N-1} Y_k e^{j2\pi nk/N} \quad n = 0, 1, \ldots, N-1 \quad (3)$$

where:

$Y_k = \tilde{X}_k$ for the selected subchannels, and $Y_k = X_k$ otherwise.

The process then continues as before to steps 22 and 23 where the control logic determines whether the peak of the new DMT symbol ($y_0$, $y_1$, ... $y_{N-1}$) exceeds the threshold. If not, the new DMT symbol is output for transmission at step 24. If the threshold is still exceeded, however, and providing the process limits have not been reached at step 25, the control logic selects in step 26 a new combination of basic and equivalent symbols, instructing the QAM encoder to supply the selected equivalent symbols to the IDFT unit which generates a new DMT symbol as before. The process is therefore iterative, continuing until either the peak of the DMT symbol has been reduced to the required level, or the process limits have been reached in step 25. In the latter case, the IDFT unit may output at step 24 the original DMT symbol, produced using the basic modulation symbols $X_k$, if this has been stored by the control logic. Alternatively, the last-produced DMT symbol could be output here, or even the DMT symbol with the lowest peak value of those produced in the iterative process if the control logic is so configured.

In the above process, the control logic determines (lie particular combination of basic and equivalent modulation symbols to be selected according to a predetermined algorithm. Many such algorithms will be apparent to those skilled in the art, but a particularly simple algorithm adopted here involves selecting, in successive iterations of the process, different permutations of q modulation symbols representing equivalent signal points, where q=1 in a first pass and q=q+1 in each subsequent pass. Thus, the first time a DMT symbol fails the threshold test, the control logic will select the equivalent symbol for one of the $N_c$ channels. In the next iteration the equivalent symbol for a different one of the $N_c$ channels will be selected, and so on until all permutations of $N_c-1$ basic modulation symbols and one equivalent symbol have been tried. In the second pass, different permutations of equivalent modulation symbols for two of the $N_c$ channels will be tried. In the third pass different permutations of equivalent modulation symbols for three of the $N_c$ channels will be tried, and so on. Up to $2^{N_c}-1$ different time domain modulation symbols ($y_0$, $y_1$, ... $y_{N-1}$) can be generated by this simple process.

In the above embodiment, the expanded QAM constellations and equivalent signal points are defined explicitly in the QAM encoder 10, and the selection of particular modulation symbols is performed by the control logic via the control input 11a, the IDFT being recalculated in each iteration. In an alternative implementation method, the control input 11a is not required and only the basic constellations for the subchannels are defined in the QAM encoder 10. In this case, the expanded QAM constellations and equivalent signal points are defined implicitly by a set of correction values prestored in the memory of the control logic. Each of these correction values represents the time-domain perturbation to be added to a DMT symbol generated by performing the IDFT using the modulation symbols $X_k$ representing basic constellation points to obtain the DMT symbol generated by performing the IDFT with a modulation symbol $X_k$ replaced by its equivalent $\tilde{X}_k$. Here, it is not necessary to re-perform the IDFT each time a new set of modulation symbols is selected. Instead, once the IDFT unit 11 has generated and stored the DMT symbol using the set of basic modulation symbols $X_k$, the new DMT symbol ($y_0$, $y_1$, ... $y_{N-1}$) can be obtained by adding to this basic symbol the correction value(s) corresponding to the selected equivalent modulation symbol(s). In this embodiment therefore, in step 26 of FIG. 4 the control logic selects the equivalent modulation symbols $\tilde{X}_k$ indirectly by simply selecting the appropriate correction values. The process then proceeds to the alternative step shown by the broken lines in FIG. 4 where the control logic applies the selected correction values to the original DMT symbol to obtain the new DMT symbol ($y_0$, $y_1$, ... $y_{N-1}$). The iterative process then continues as described above, with different permutations of (lie correction values being selected in each iteration.

Operation of the receiver 2 in FIG. 2 will be apparent to those skilled in the art from the foregoing description of the transmitter operation. Briefly, after the received signal has been filtered, digitized and converted to parallel form by the receiver units 12 to 14, the DFT unit 18 performs the complementary Fourier transform and supplies the resulting modulation symbols to the QAM decoder 19. The constellations used for the N subchannels, including the expanded constellations for the $N_c$ subchannels used for PAR control, are defined in the QAM decoder 19 which maps the input signals back to the original data elements $m_k$. These are then supplied in parallel to the P/S converter 16 which reproduces the original data block S on its output 17. The receiver 2 thus functions to demodulate signals produced by the transmitter 1 using the expanded constellations for PAR control, but can of course also demodulate effectively signals produced by a transmitter using only the basic constellations without PAR control.

Figure 5:
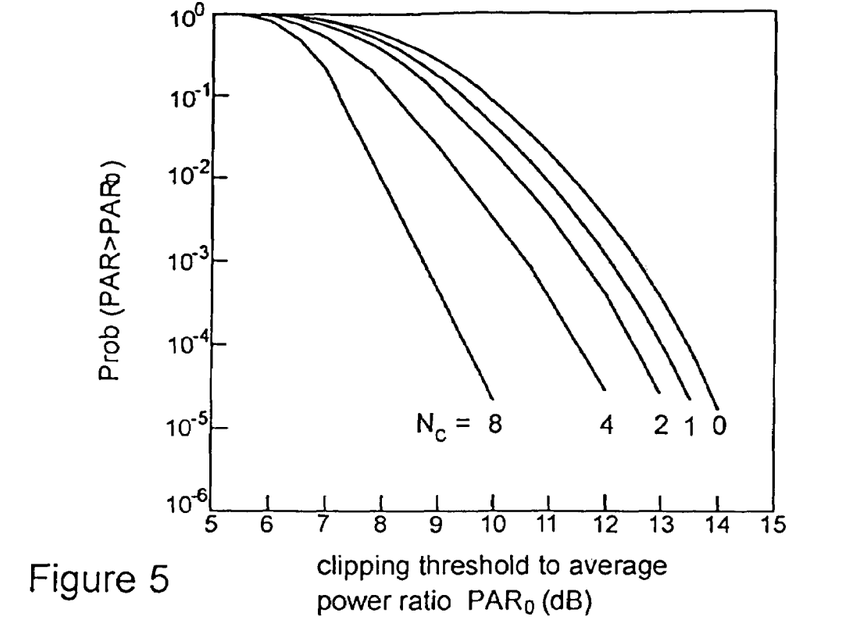
FIG. 5 is a graph indicating the performance of a PAR control system embodying the invention.

FIG. 5 illustrates the performance achieved by a PAR control method as described above which utilizes a 64-point IDFT and a basic 64-point QAM constellation for all subchannels except for subchannels centred at dc and the Nyquist frequency which are not modulated. The horizontal axis in this graph represents the squared clipping threshold $\theta^2$-to-average power ratio:

$$PAR_0 = 10 \log_{10}(\theta^2/\sigma_x^2) \quad (4)$$

The plotted curves show the probability of $PAR > PAR_0$ for various values of $N_c$, ie the number of channels for which an expanded 128-point constellation is employed for PAR control. The case $N_c=0$ represents a reference case with no PAR control. Note here that the same definition is used for the PAR variable as that given in equation (2) with P now replaced by the clipping threshold $\theta$. It will be seen, for example, that a PAR reduction of about 4 dB is obtained at $Prob(PAR > PAR_0) = 10^{-5}$ by using $N_c=8$. Clearly, larger gains could be achieved by increasing the number of subchannels used for PAR control.

Figure 6:
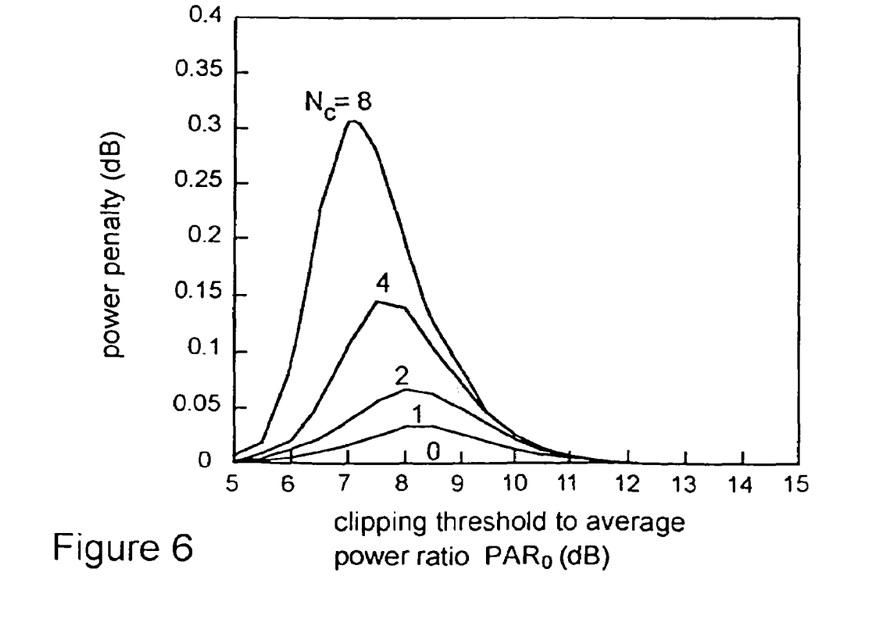
FIG. 6 is a graph indicating the power penalty for the system of FIG. 5.

The penalty in average transmit power in this example can be evaluated from the curves in FIG. 6 which show $E\{y_n^2\}/\sigma_x^2$ in dB as a function of $PAR_0$ for the values of $N_c$ considered in FIG. 5. For the reference system without PAR control, $E\{y_n^2\}=\sigma_x^2$ (0 dB). It is assumed here that if, for a given DMT symbol, the peak cannot be reduced to the desired threshold, then the original DMT symbol is transmitted unmodified. Hence, for lower values of $PAR_0$ the power penalty tends to be 0 dB. A similar behaviour is obtained for large values of $PAR_0$ where PAR control needs to be applied less frequently. We see that for $PAR_0 \geq 10$ dB, which for $N_c=8$ allows $Prob(PAR > PAR_0) \leq 10^{-5}$, the penalty in average transmit power is only a small fraction of a dB.

It will be seen from the above that embodiments of the invention provide highly efficient DMT systems which provide effective PAR control without significant average power penalties or undue system complexity. It will be appreciated, however, that while preferred embodiments of the invention have been described, many changes and modifications can be made to these embodiments without departing from the scope of the invention. For example, in embodiments of the invention the PAR control techniques described above can be readily combined with other PAR control or coding techniques, such as trellis coding for example, as will be apparent to those skilled in the art. Further, while expansion of the basic constellation by a factor of two is generally preferred as providing ample PAR control, expansion by an integral factor p>2 could be used if desired. Here there will of course be p−1 equivalent signal points in the expanded constellation for each basic constellation point, providing greater scope for PAR reduction at the expense of average transmit power. In such cases, the p−1 equivalent signal points for a given basic point would all be selected from redundant points in the opposite quadrant to the basic point, with the specific mapping being a matter of design choice. Also, while simple constellations have been described for illustration purposes, embodiments of the invention can be applied for any original symbol constellation. Moreover, if system constraints allow for expanded symbol constellations that are not limited to square or cross constellations, the expanded constellation can be chosen to minimize some meaningful parameter of the system. In particular, the expanded constellation is preferably chosen from the possible constellations with the appropriate number of points as the constellation which provides the lowest average transmit power. Thus, in comparison with the systems referenced above which are restricted by use of a modulo extension method, embodiments of the invention provide increased flexibility to optimize system parameters, eg. by reducing the average signal energy.

I claim:

1. A method for generating a discrete multitone signal comprising:

modulating N carriers, corresponding to respective subchannels, in each sample period of the signal by performing an inverse discrete Fourier transform of N modulation symbols each of which symbols represents a signal point in a QAM constellation for a respective subchannel, said QAM constellation comprising a basic constellation of $M \geq 2^m$ signal points where m is the number of data bits to be communicated over the subchannel in a said sample period;

defining, for each of $N_c \leq N$ of said subchannels, an expanded QAM constellation comprising pM signal points including said basic constellation of points, where p is an integer greater than 1;

defining, in each said expanded constellation, p−1 equivalent signal points for each signal point of the basic constellation, where each of the p−1 equivalent points is selected from redundant points in the opposite quadrant of the constellation to the corresponding point of the basic constellation; and, generating the discrete multitone signal in a said sample period by selecting, for each of said $N_c$ subchannels, the modulation symbol representing either a basic constellation point or a corresponding equivalent point such that the peak value of the signal does not exceed a predetermined threshold.

2. A method according to claim 1 wherein, when the modulation symbol representing a said equivalent point is selected for a subchannel, the method includes performing said inverse discrete Fourier transform using the modulation symbol representing said equivalent point to generate the discrete multitone signal.

3. A method according to claim 1 wherein said expanded QAM constellations and said equivalent signal points are defined implicitly by a prestored set of correction values, each correction value representing a perturbation to be applied to a discrete multitone signal generated by performing said inverse discrete Fourier transform using a modulation symbol representing a 30 basic constellation point to obtain the discrete multitone signal generated by performing said inverse discrete Fourier transform using the modulation symbol representing a corresponding equivalent signal point, and wherein, when the modulation symbol representing a said equivalent point is selected for a subchannel, the method includes performing said inverse discrete Fourier transform using the modulation symbol representing the corresponding basic constellation point, and applying to a resulting signal the correction value corresponding to said equivalent point to 5 generate the discrete multitone signal.

4. A method according to claim 1 wherein p=2.

5. A method according to claim 1 wherein the discrete multitone signal is generated in a said sample period by:
  (a) performing said inverse discrete Fourier transform using modulation symbols representing basic constellation points for said N subchannels;
  (b) determining whether the peak value of the resulting signal exceeds said threshold, and if so selecting, for at least one of said $N_c$ subchannels, the modulation symbol representing a corresponding equivalent point; and
  (c) repeating step (b) until the peak value of the signal does not exceed said threshold.

6. A method according to claim 5 wherein, in successive iterations of step (b), different permutations of q modulation symbols representing equivalent signal points are selected, where q=1 in a first pass and q=q+1 in each subsequent pass.

7. A method according to claim 1 wherein the discrete multitone signal comprises said N subchannels and one or more further subchannels.

8. A method according to claim 7 wherein said further subchannels comprise respective subchannels at dc and a Nyquist frequency which are not modulated.

9. A method according to claim 1 wherein $M=2^m$.

10. A method according to claim 1 wherein a said expanded constellation is selected from possible constellations of pM signal points as the constellation providing a lowest average transmit power.

11. Apparatus for generating a discrete multitone signal, the apparatus comprising:
  a modulator for modulating N carriers, corresponding to respective subchannels, in each sample period of the signal by performing an inverse discrete Fourier transform of N modulation symbols, each of which symbols represents a signal point in a QAM constellation for a respective subchannel, said QAM constellation comprising a basic constellation of $M \geq 2m$ signal points where m is the number of data bits to be communicated over the subchannel in a said sample period;
  means defining, for each of $Nc \leq N$ of said subchannels, an expanded QAM constellation comprising pM signal points including said basic constellation of points, where p is an integer greater than 1, and further defining, in each said expanded constellation, p−1 equivalent signal points for each signal point of the basic constellation, where each of the p−1 equivalent points is selected from redundant points in the opposite quadrant of the constellation to the corresponding point of the basic constellation; and
  control logic for selecting, for each of the $N_c$ subchannels, the modulation symbol representing either a basic constellation point or a corresponding equivalent point for generation of the discrete multitone signal in a said sample period such that the peak value of the signal does not exceed a predetermined threshold value.

12. Apparatus according to claim 11 wherein said means defining said expanded constellations and said equivalent points comprises a QAM encoder, and wherein the control logic is configured to control the modulator such that, when the modulation symbol representing a said equivalent point is selected for a subchannel, the modulator performs said inverse discrete Fourier transform using the modulation symbol representing said equivalent point to generate the discrete multitone signal.

13. Apparatus according to claim 11 wherein:
  said means defining said expanded constellations and equivalent signal points comprises a memory storing a set of correction values which define said expanded constellations and said equivalent signal points implicitly, each correction value representing a perturbation to be applied to a discrete multitone signal generated by performing said inverse discrete Fourier transform using a modulation symbol representing a basic constellation point to obtain the discrete multitone signal generated by performing said inverse discrete Fourier transform using the modulation symbol representing a corresponding equivalent signal point;
  the modulator is configured to perform said inverse discrete Fourier transform using modulation symbols representing basic constellation points for said N subchannels;
  and wherein, when the modulation symbol representing said equivalent point is selected for a subchannel, the control logic is configured to apply the correction value corresponding to said equivalent point to the signal produced by the modulator to generate the discrete multitone signal.

14. Apparatus according to claim 11 wherein p=2.

15. Apparatus according to claim 11 wherein:
  the modulator is configured to perform said inverse discrete Fourier transform using modulation symbols representing basic constellation points for said N subchannels; and the control logic is configured to (a) determine whether the peak value of a resulting signal exceeds said threshold, and if so to select, for at least one of said $N_c$ subchannels, the modulation symbol representing a corresponding equivalent point, and (b) to repeat step (a) until the peak value of the signal does not exceed said threshold.

16. Apparatus according to claim 15 wherein the control logic is configured to select different 25 permutations of q modulation symbols representing equivalent signal points in successive iterations of step (a), where q=1 in a first pass and q=q+1 in each subsequent pass.

17. Apparatus according to claim 11 wherein $M=2^m$.

18. A communication system comprising:
  a transmitter for transmitting a discrete multitone signal, the transmitter comprising:

a modulator for modulating N carriers, corresponding to respective subchannels, in each sample period of the signal by performing an inverse discrete Fourier transform of N modulation symbols, each of which symbols represents a signal point in a QAM constellation for a respective subchannel, said QAM constellation comprising a basic constellation of $M \geq 2^m$ signal points where m is the number of data bits to be communicated over the subchannel in a said sample period;

means defining, for each of $N_c \leq N$ of said subchannels, an expanded QAM constellation comprising pM signal points including said basic constellation of points, where p is an integer greater than 1, and further defining, in each said expanded constellation, p−1 equivalent signal points for each signal point of the basic constellation, where each of the p−1 equivalent points is selected from redundant points in the opposite quadrant of the constellation to the corresponding point of the basic constellation; and control logic for selecting, for each of the $N_c$ subchannels, the modulation symbol representing either a basic constellation point or a corresponding equivalent point for generation of the discrete multitone signal for transmission in said sample period such that the peak value of the signal does not exceed a predetermined threshold value; and a receiver for receiving and demodulating such a discrete multitone signal to generate the data represented thereby.

\* \* \* \* \*